July 31, 1973 R. W. WALDO Re. 27,714
PNEUMATIC DOOR CLOSER
Original Filed Aug. 15, 1969
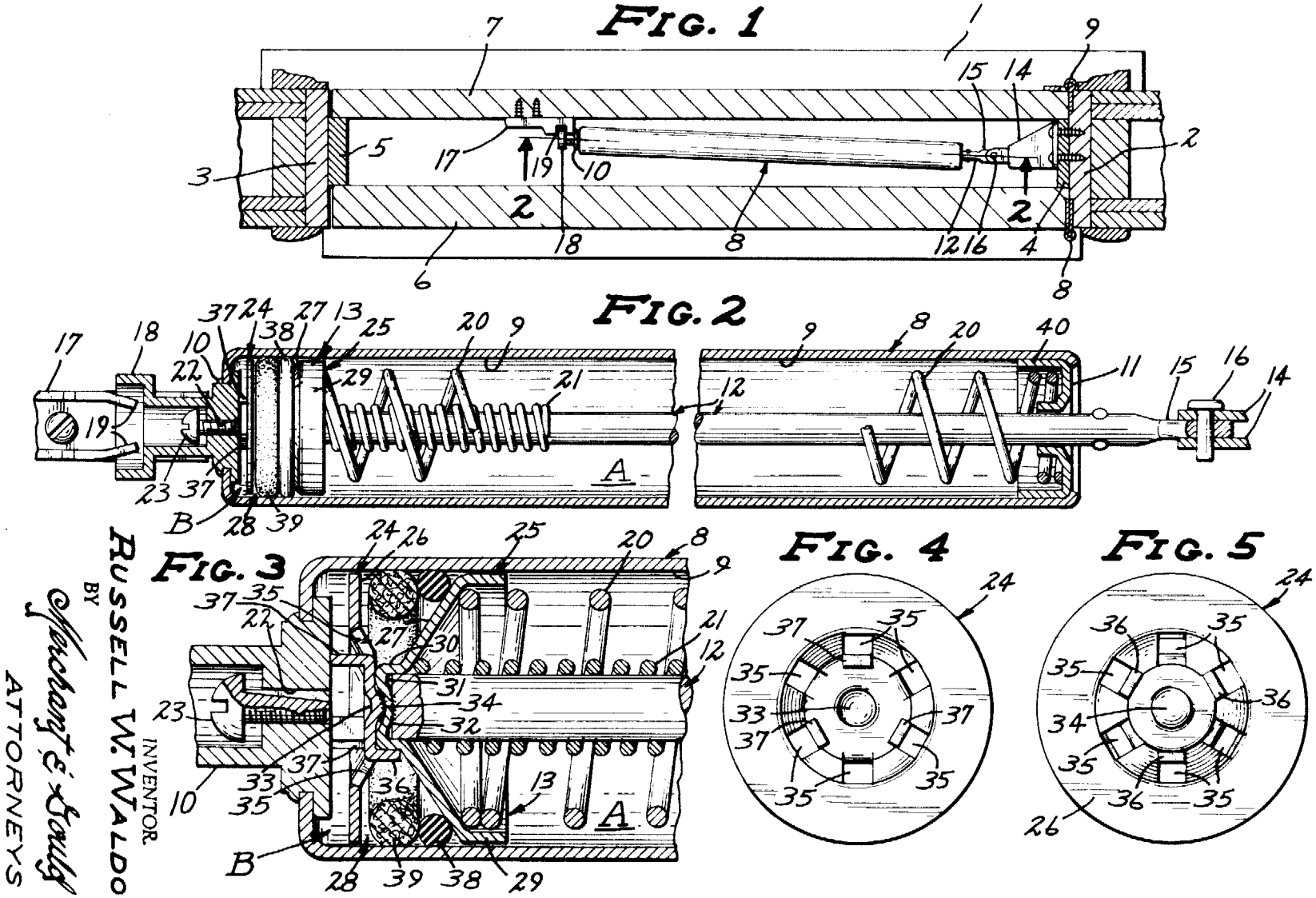
INVENTOR.
RUSSELL W. WALDO
BY
Merchant & Gould
ATTORNEYS United States Patent Office Re. 27,714
Reissued July 31, 1973

27,714

PNEUMATIC DOOR CLOSER

Russell W. Waldo, St. Paul, Minn., assignor to Ideal Security Hardware Corp., St. Paul, Minn.

Original No. 3,593,367, dated July 20, 1971, Ser. No. 850,578, Aug. 15, 1969. Application for reissue Mar. 1, 1972, Ser. No. 231,036
Int. Cl. E05f *3/00*
U.S. Cl. 16—66 8 Claims

Matter enclosed in heavy brackets [ ] appears in the original patent but forms no part of this reissue specification; matter printed in italics indicates the additions made by reissue.

ABSTRACT OF THE DISCLOSURE

Piston means in a pneumatic door closer and including a body structure defining a radially outwardly opening annular channel having axially spaced sidewalls, a sealing ring movable axially toward and away from one of the sidewalls, and a porous lubricating ring disposed between the other of the sidewalls and the sealing ring. Both rings frictionally engage the cylindrical surface of an elongated casing in which the piston means is axially movable. The piston means includes a pair of cooperating elements welded together and to the inner end of a plunger rod which extends axially outwardly of one end of the casing.

BACKGROUND OF THE INVENTION

Heretofore, pneumatic door closers of the piston-cylinder type have utilized various lubricating devices, such as oil-soaked sleevelike wicks more or less loosely contained in the cylinders, for coating the cylinder wall and moving parts of the closers with oil or other lubricant. One such arrangement is disclosed in U.S. Pat. No. 2,646,589 to Bert A. Quinn. Lubricating devices of this general type depend upon capillary action and they do not always coat the interior cylinder wall surface of the casing uniformly. Further, piston structures in pneumatic door closers, heretofore produced have been turned from metal bar stock, or die-cast, and have been relatively heavy and costly to produce and assemble.

SUMMARY OF THE INVENTION

The piston structure of this invention comprises a pair of cooperating piston body elements inexpensively formed from sheet metal welded to each other and to the inner end of a cooperating plunger rod at a single point or small area to provide a rigid lightweight assembly. One of the body elements is in the nature of a generally disclike washer and is formed to provide a flat radial wall, the other element being generally cup shaped and formed with a generally conical wall providing a seat, and a central hollow boss, the conical wall diverging radially outwardly with respect to the flat wall of the washer element. The hollow boss receives the inner end of the plunger rod, and is formed with an end wall having a convex surface abutting the inner end of the plunger rod, the opposite of the end wall being concave. The disclike washer element is formed to provide a central dimple having a convex surface abutting the concave surface of the boss end wall, and circumferentially spaced tabs projecting in one direction and fitting over the hollow boss and other circumferentially spaced tabs projecting axially in the opposite direction for engagement with one end of the casing to limit movement of the piston means toward said one end of the casing. The piston structure further includes a sealing ring disposed generally concentrically between the piston body element in closely fitting axial sliding engagement with the cylinder wall of the casing and movable toward and away from seating engagement with the conical seating surface; and a porous lubricant-saturated lubricating ring disposed between the sealing ring and the washer element in concentric wiping engagement with the cylinder wall of the casing, whereby lubricant is applied directly to the casing wall over the length thereof traversed by the piston structure. The disc-like element is further formed to provide a plurality of air passages therethrough radially inwardly relative to the sealing and lubricating rings, flange means extending in one direction to telescopically receive the hollow boss, and stop means projecting in the opposite direction for engagement with the adjacent end of the casing to limit movement of the piston means and plunger rod toward the adjacent end of the casing.

DESCRIPTION O FTHE DRAWINGS

FIG. 1 is a view partly in top plan and partly in section, showing the pneumatic door closer of this invention mounted to a doorframe and to a door hingedly mounted in the doorframe;

FIG. 2 is an enlarged fragmentary section taken substantially on the line 2—2 of FIG. 1;

FIG. 3 is a still further enlarged fragmentary section corresponding generally to a portion of FIG. 2;

FIG. 4 is a view in end elevation of a disclike washer element of this invention as viewed from the left to the right with respect to FIGS. 2 and 3; and FIG. 5 is a view of the washer element of FIG. 4 as seen from the opposite side thereof.

DETAILED DESCRIPTION

In FIG. 1, a doorframe is shown as including a doorsill 1, laterally spaced generally vertically disposed doorframe members 2 and 3, and stop strips 4 and 5 thereon. Inner and outer doors 6 and 7 are hingedly secured to the doorframe member 2, as indicated at 8 and 9 respectively. For the purpose of the present example, it may be assumed that the door 7 is an outer screen or storm door, with which the present door closer is particularly adapted for use.

The present door closer comprises; an elongated tubular casing 8 having an inner cylindrical wall surface 9, a closure member 10 at one end of the casing 1, and a bushing element 11 at the opposite end thereof; a plunger rod 12 extending axially within the casing 8 and projecting outwardly through the bushing 11; piston means mounting the inner end of the plunger rod 12 and indicated generally at 13; a mounting bracket 14 pivotally secured to the outer end 15 of the plunger rod 12, by means of a pivot pin or the like 16; and a second bracket 17. As shown in FIG. 1, the bracket 14 is adapted to be secured to the stop strip 4 and frame member 2, the bracket 17 being rigidly secured to the door 7. The closure member 10 is provided with an annular cup-shaped portion 18, the bracket 17 being formed to provide hook portions 19 by means of which the closure member 10 is secured to the bracket 17. The plunger rod 12 is urged in a door closing direction longitudinally of the casing 8 by a coil compression spring 20 interposed between the piston means 13 and the bushing 11, and a smaller coil compression snubber spring 21 is loosely wound on the plunger rod 12 between the piston means 13 and bushing 11. The snubber spring 21 is of substantially less axial length than the spring 20, and cushions shock load on the door closer, when the door is swung violently toward its full open position. The closure member 10 is provided with a screw-threaded axial opening 22 for reception of a slotted screw 23 for adjustably admitting air to the interior of the casing 8 between the closure member 10 and piston means 13 and for permitting escape of air outwardly therefrom, in the usual manner, moves into engagement with the lubricating ring 39.

The piston means 13 comprises body structure including a disclike washer element 24 and a generally cup-shaped valve seat element 25, the disclike washer element having a radially flat annular surface 26 in axially spaced opposed relationship to a generally conical valve seat surface 27 on the valve seat element 25, the surface 27 diverging in a direction radially outwardly with respect to the annular surface 26 and cooperating therewith to provide a radially outwardly opening channel 28. The valve seat element 25 is formed to provide a marginal skirt or flange 29 that projects toward the end of the casing 9 containing the bushing 11. With reference to FIG. 3, it will be seen that the outer diameters of the skirt 29 and washer element 24 are somewhat less than the diameter of the cylindrical casing surface 9, so that air is permitted to pass freely therebetween.

At its central portion, the valve seat element 25 is formed to provide a hollow boss 30 having an end wall 31, for reception of the adjacent inner end of the plunger rod 12. As shown in FIG. 3, the end wall 31 is formed to define a convex surface 32 which abuts the adjacent end of the plunger rod 12, the opposite side of the end wall 31 being concave. At its central portion, the washer element 24 is formed to provide a dimple 33 having a convex surface 34 that at least partially engages the adjacent concave surface of the end wall 31. It will be noted that the radius of the convex dimple surface 34 is smaller than that of the adjacent concave surface of the end wall 31, so that there is substantially point contact therebetween. It will be further noted, with reference to FIG. 3 that the adjacent end of the plunger rod 12 is flat so that there is substantially point contact between the inner end of the plunger rod 12 and the convex surface 32 of the end wall 31. Radially outwardly of the dimple 33, the washer element 25 is pierced to provide a plurality of circumferentially spaced air passages 35 therethrough and formed to provide flange means in the nature of a plurality of circumferentially spaced tabs or ears 36 that telescopically receive the hollow boss 30 of the valve seat element 25 to axially align the washer element 24 with the valve seat element 25. Other tabs 37 are punched from given ones of the openings 35 in a direction axially opposite the tabs 36, and are engageable with the closure member 10 to limit movement of the piston means 13 in a door-closing direction toward the closure member 10. It will be noted, with reference to FIGS. 3–5, that the tabs 37 are disposed alternately with respect to the tabs 36, the tabs 37 effectively preventing the radially outer portions of the washer element 24 from impinging on the closure member 10 whereby to prevent possible warping of the washer element 24.

The tabs 36 and hollow boss 30 accurately hold the washer element 24, seating element 25 and plunger rod 12 in their relative positions during assembly, wherein these parts are permanently joined together, preferably by resistance welding at the points of contact therebetween on the common axis thereof, as shown in FIG. 3.

A sectionally circular sealing ring 38, of rubber or other suitable elastic material is disposed within the annular channel 28 concentric with the cylindrical surface 9 of the casing 8. The sealing ring 38 preferably has an outer diameter to snugly slidably fit the surface 9, and is disposed adjacent the conical surface 27 of the valve seat element 25, so as to have sealing engagement therewith. A cross-sectionally circular lubricating ring 39 is also disposed in the channel 28 between the sealing ring 38 and the washer element 24, the lubricating ring 39 also being of a diameter to snugly slidably fit the inner surface 9 of the casing 8. As shown in FIG. 3, the combined axial dimension of the rings 38 and 39 is slightly less than the axial dimension of the annular groove 28 at the point where the sealing ring 38 seatingly engages the conical surface 27 of the valve seat element 25. The lubricating ring 39 is made from felt or other suitable porous material, and is soaked with oil or similar lubricant, so that upon axial movement of the piston means 13 within the casing 8, the greater portion of the length of the cylindrical surface 9 will be lubricated thereby, each time the door 7 is opened and closed.

With reference to FIGS. 2 and 3, it will seen that the spring 20, being contained at one end within the marginal flange or skirt 29 of the valve seat element 25, and at its other end within a skirtlike portion 40 of the bushing 11, is at least partially held against contact with the inner cylindrical casing surface 9 to insure smoothness of operation. Should the longitudinally intermediate portion of the spring 20 become arched or bowed so that some of the convolutions thereof come into contact with the inner casing surface 9 during opening and closing movements of the door 7, these casing-surface engaging convolutions will slide easily and smoothly over the casing surface 9 due to the coating of lubricant applied thereto by the lubricating ring 39.

Due to the above-mentioned differential between the combined axial dimensions of the sealing rings 38 and 39 and the portions of the groove 28 engaged thereby, a predetermined lost motion is obtained between the rings 38–39 and the piston elements 24–25 during reversal of reciprocatory movement of the piston means 13. It will be noted that the passages 35 are disposed radially inwardly of the rings 38 and 39 to permit free passage of air through the passages 35 from one side of the washer element 24 to the other thereof. During opening movements of the door, the plunger rod 12 and piston means 13 move from the left to the right with respect to FIGS. 2 and 3 relative to the casing 8. During the initial portion of such movement, the valve seat element 25 moves out of engagement with the sealing ring 38, and the washer element 24 moves into engagement with the lubricating ring 39. As such door-opening movement continues, air within the cylinder chamber indicated at A moves between the cylindrical surface 9 and skirt 29, generally radially inwardly between the conical surface 25 and sealing ring 38, and axially through the passages 35 to a cylinder chamber B between the piston means 13 and closure member 10. This movement of air from the cylinder chamber A to the cylinder chamber B is quite free, permitting the door 7 to be relatively easily opened, substantially the only load against door-opening movement being applied by compression of the spring 20. Then, when the door 7 is released for closing, the spring 20 urges the plunger rod 12 and piston means 13 relatively toward the closure member 10, initial door-closing movements causing the conical surface 27 to move into sealing engagement with the sealing ring 38, thus effectively closing off passage of air from the cylinder chamber B to the cylinder chamber A. After sealing contact is made between the sealing ring 38 and conical seating surface 27, air escapes from the cylinder chamber B outwardly through the metered opening 22 at a predetermined rate of flow.

With the above-described construction, I have provided a door closer that is simple and inexpensive to fabricate and assemble and which is quiet and smooth in operation. The lubricating ring 39, having a greater circular cross section than the sealing ring 38, tends to hold the sealing ring 38 radially outwardly against the cylindrical wall surface 9 during door-closing movement of the piston means 13, the thickness of lubricating ring 39 enabling the same to hold sufficient lubricant to properly lubricate the wall surface 9 over greatly extended periods of time.

What I claim is:

1. A pneumatic door closer comprising:

(a) an elongated casing having an inner cylindrical wall surface, a closure member at one end, and an axial opening at its other end;

(b) a plunger rod extending axially through said axial opening for movements axially of said casing and having inner and outer ends respectively within and axially outwardly of said casing;

(c) means on said plunger rod outer end and said closure member for connection one to a door frame and the other to a door hingedly mounted in the doorframe;

(d) piston means on the inner end of said plunger rod comprising:

(1) body structure including a disclike washer element having a flat radial wall portion and air passage means extending in a direction axially therethrough, and a generally cup-shaped valve seat element having a conical wall portion diverging radially outwardly with respect to said flat radial wall portion and defining therewith a radially outwardly opening annular channel, the body structure having radially outer marginal portions inwardly spaced from said cylindrical wall surface, said washer element being disposed between said valve seat element and said closure member;

(2) a sealing ring in said channel concentric with and in close fitting sliding engagement with said inner cylindrical wall surface and movable toward and away from sealing engagement with said conical wall portion;

(3) and a porous lubricating ring in said channel in closely fitting sliding engagement with said cylindrical wall surface axially adjacent said sealing ring and positioned to engage said flat radial wall portion;

(4) said channel having an axial dimension greater than the combined axial dimension of said sealing and lubricating rings to permit limited axial movement of said body structure relative to said rings (e) and yielding means in said casing urging said piston means and plunger rod in a door-closing direction toward said closure member;

(f) said valve element being formed to provide an axial hollow boss defining a recess for reception of the inner end of valve seat plunger rod, said inner end of the plunger rod and said washer being welded to said boss.

2. The door closer defined in claim 1 in which said washer element includes axially projecting flange means telescopically received over said boss to axially align said washer element with said valve seat element.

3. The door closer defined in claim 2 in which said washer element includes stop lug means projecting in an axial direction opposite said flange means for engagement with said closure member to limit movement of said plunger rod and piston means in a door-closing direction toward said closure member.

4. The door closer defined in claim 2 in which said hollow boss includes a closed end wall having a convex surface engaging the adjacent end of said plunger rod and an opposite concave surface facing said washer element, said washer element having a central dimple having a convex surface engaging the concave surface of said closed end wall, said washer element, sealing element and the adjacent end of said plunger rod being welded together at said dimple and said convex and concave surfaces of said end wall of the boss.

5. The door closer defined in claim 4 which said convex dimple surface has a radius of curvature less than that of the adjacent concave surface of said boss end wall to provide a substantially point contact therebetween.

6. The door closure defined in claim 3 in which said washer element is formed from sheet metal, said flange means comprising a plurality of circumferentially spaced tabs sheared and bent from said washer element in one direction axially thereof to provide portions of said air passage means, said stop lug means comprising a plurality of circumferentially spaced tabs sheared and bent from said washer element in the opposite direction axially thereof each alternately with a different one of said first-mentioned tabs to provide other portions of said air passage means.

7. A pneumatic door closer comprising:

(a) an elongated casing having an inner cylindrical wall surface, a closure member at one end, and an axial opening at its other end;

(b) a plunger rod extending axially through said axial opening for movements axially of said casing and having inner and outer ends respectively within and axially outwardly of said casing;

(c) means on said plunger rod outer end to said closure member for connection one to a doorframe and the other to a door hingedly mounted in the doorframe;

(c) means on said plunger rod outer end and said clo- comprising:

(1) body structure defining a radially outwardly opening annular channel having a flat radial wall and a generally conical wall axially spaced from and diverging radially outwardly from said flat radial wall, said flat radial wall having air passage means extending in a direction axially therethrough from said channel, said body structure having radially outer marginal portions inwardly spaced from said cylindrical wall surface;

(2) a sealing ring disposed in said channel in closely fitting sliding engagement with said inner cylindrical wall surface and for axial movements relative to said body structure toward and away from axial abutment with said generally conical wall;

(3) and a porous lubricating ring in said channel in closely fitting sliding engagement with said inner cylindrical wall surface, said lubricating ring being disposed for axial movements between axially abutting relation with said sealing ring and said flat radial wall;

(4) said channel having an axial dimension greater than the combined axial dimension of said sealing and lubricating rings to permit limited axial movement of said body structure relative to said rings;

(e) and yielding means in said casing urging said piston means and plunger rod in a door-closing direction toward said closure member.

*8. A pneumatic door closer comprising:*

*(a) an elongated casing having an inner cylindrical wall surface, a closure member at one end, and an axial opening at its other end;*

*(b) a plunger rod extending axially through said axial opening for movement axially of said casing and having inner and outer ends respectively within and axially outwardly of said casing;*

*(c) means on said plunger rod outer end and said closure member for connection one to a doorframe and the other to a door hingedly mounted to the doorframe;*

*(d) piston means on the inner end of said plunger rod comprising:*

*(1) body structure defining a radially outwardly opening annular channel having a flat radial wall and a generally conical wall axially spaced from and diverging radially outwardly from said flat radial wall, said flat radial wall being arranged to provide passage means extending in a direction axially from said channel, said body structure having radially outer marginal portions inwardly spaced from said cylindrical wall surface;*

*(2) a sealing ring disposed in said channel in closely fitting sliding engagement with said inner cylindrical wall surface and for axial movements relative to said body structure toward and away from axial abutment with said generally conical wall;*

*(3) and a porous lubricating ring in said channel in closely fitting sliding engagement with said inner cylindrical wall surface, said lubricating ring being disposed for axial movements between axially abutting relation with said sealing ring and said flat radial wall;*

*(4) said channel having an axial dimension greater than the combined axial dimension of said sealing and lubricating rings to permit limited axial movement of said body structure relative to said rings;*

*(e) and yielding means in said casing urging said piston means and plunger rod in a door-closing direction toward said closure member.*

References Cited

The following references, cited by the Examiner, are of record in the patented file of this patent or the original patent.

UNITED STATES PATENTS

| | | | |
|---|---|---|---|
| 3,131,420 | 5/1964 | Quinn | 16—66 |
| 3,158,894 | 12/1964 | Quinn | 16—66 |

FRANCIS K. ZUGEL, Primary Examiner

P. A. ASCHENBRENNER, Assistant Examiner

U.S. Cl. X.R.

188—88; 16—52